(12) United States Patent
Ono et al.

(10) Patent No.: US 7,830,167 B2
(45) Date of Patent: Nov. 9, 2010

(54) PRE-EMPHASIS CIRCUIT

(75) Inventors: Goichi Ono, Tokyo (JP); Hiroki Yamashita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/453,981

(22) Filed: May 28, 2009

(65) Prior Publication Data

US 2009/0296851 A1  Dec. 3, 2009

(30) Foreign Application Priority Data

May 30, 2008  (JP) ............................. 2008/142502

(51) Int. Cl.
*H03K 17/16* (2006.01)
*H03K 19/003* (2006.01)

(52) U.S. Cl. .............................. 326/27; 326/31; 326/83

(58) Field of Classification Search ....................... None
See application file for complete search history.

(56) References Cited

U.S. PATENT DOCUMENTS

2005/0093580 A1 * 5/2005 Baig et al. .................... 327/65
2005/0157781 A1   7/2005 Ho et al.
2009/0267640 A1 * 10/2009 Kuzmenka ................... 326/30

FOREIGN PATENT DOCUMENTS

JP  2007-515130  12/2004
JP  2007-129619  11/2005

* cited by examiner

*Primary Examiner*—Rexford N Barnie
*Assistant Examiner*—Jany Tran
(74) *Attorney, Agent, or Firm*—Stites & Harbison, PLLC; Juan Carlos A. Marquez, Esq.

(57) ABSTRACT

A pre-emphasis circuit which can improve a communication quality of a data transmission at low cost is provided. A current switch circuit, a current adder circuit, and transition detection circuits are provided in a transmitter of a data transmission system. The transition detection circuits detect transitions of transmission data signals which are a differential pair. The current switch circuit receives the transmission data signals, carries driving currents in accordance with the transmission data signals, and outputs output data signals which are a differential pair. The current adder circuit receives detection signals from the transition detection circuits, and adds driving currents in accordance with the detection signals to load resistors. By this means, output data signals in which the transitions are emphasized are inputted to a transmission line.

1 Claim, 9 Drawing Sheets

PRE-EMPHASIS CIRCUIT

CROSS-REFERENCE TO RELATED APPLICATION

The present application claims priority from Japanese Patent Application No. JP 2008-142502 filed on May 30, 2008, the content of which is hereby incorporated by reference into this application.

TECHNICAL FIELD OF THE INVENTION

The present invention relates to a pre-emphasis circuit. More particularly, the present invention relates to a technique effectively applied to a pre-emphasis circuit on a transmission side in a data transmission system.

BACKGROUND OF THE INVENTION

Figure 2:
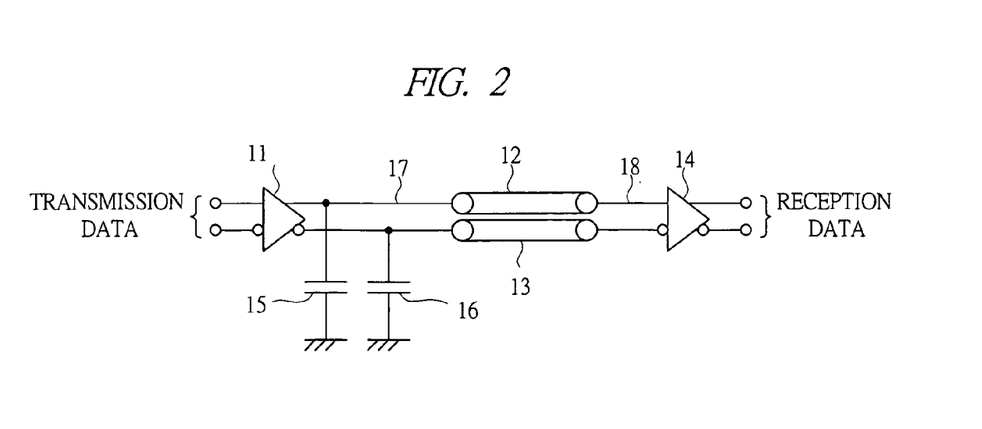
FIG. 2 is a schematic diagram of a normal data transmission system.

FIG. 2 is a schematic diagram of a normal data transmission system. The data transmission system is configured with a transmitter 11, transmission lines 12 and 13, and a receiver 14. Capacitors 15 and 16 indicate load capacitances of output terminals of the transmitter 11. Although a differential signal system is taken as an example in FIG. 2, the data transmission system may be a single-ended signal system. In the data transmission system, a transmission data signal is transmitted via the transmitter 11. An output signal 17 of the transmitter 11 reaches the receiver 14 via the transmission line 12 of, for example, a backplane board.

Figure 3:
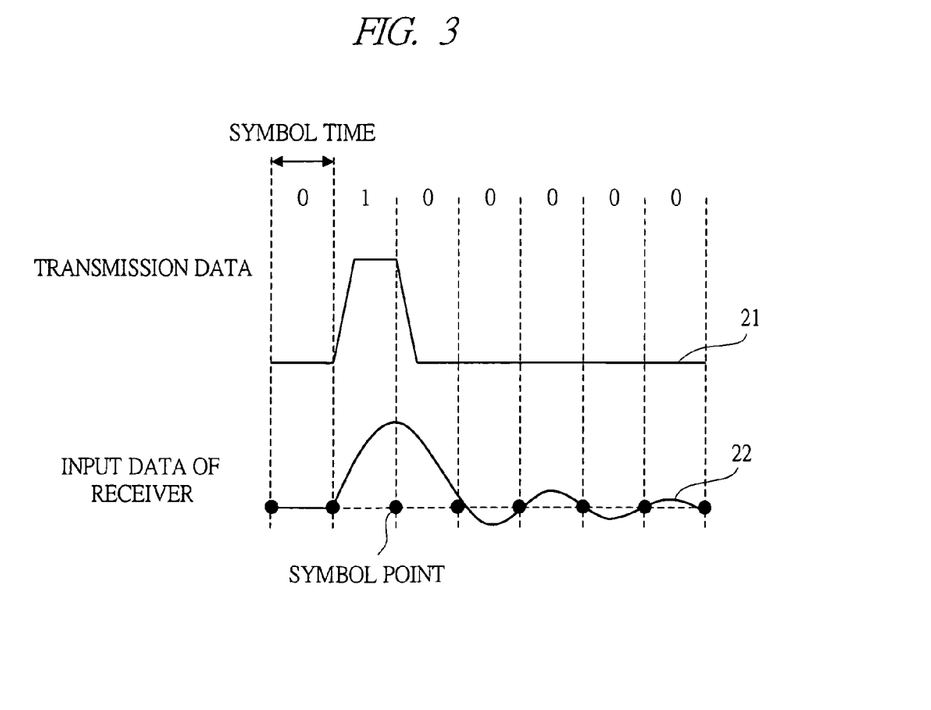
FIG. 3 is a diagram showing waveforms before and after a transmission line in a data transmission system.
Figure 4:
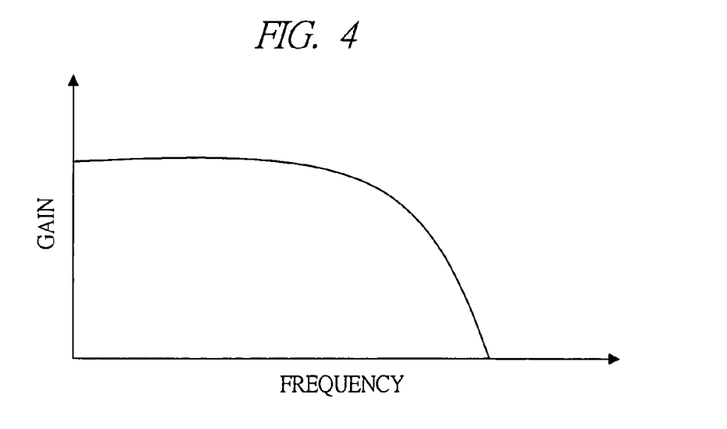
FIG. 4 is a diagram showing a loss characteristic of the transmission line.

Here, the waveform of an output signal 18 of the transmission line 12 is attenuated or distorted compared with that of the input signal (17) due to attenuation, reflection, and cross talk in the transmission line 12. FIG. 4 is one example of the loss characteristics of the transmission line 12. Generally, frequency characteristics of the transmission line loss have characteristics of a low-pass filter that causes higher attenuation in a higher frequency component of a signal. FIG. 3 shows an input waveform 21 and an output waveform 22 in a case of transmitting "1" only for one bit in the transmission line having the transmission loss characteristics as shown in FIG. 4. Due to the attenuation characteristics of the transmission line, an amplitude of the output waveform 22 is decreased and a waveform distortion is caused. Also, a rising time and a falling time of the waveform are increased. Consequently, the waveform distortion is mixed in a next symbol, so that ISI (Inter Symbol Interference) that makes data reception difficult is caused. In the receiver 14, the original transmission data is recovered from the signal 18.

In the data transmission system as shown in FIG. 2, a pre-emphasis function is normally used in a data driver circuit on the transmission side for compensating the deterioration of communication quality due to the signal attenuation in the transmission line and the like. More specifically, in anticipation of the signal attenuation in the transmission line, the data is transmitted while emphasizing the waveform shape of the transmission data signal so as to offset the attenuation.

Figure 5:
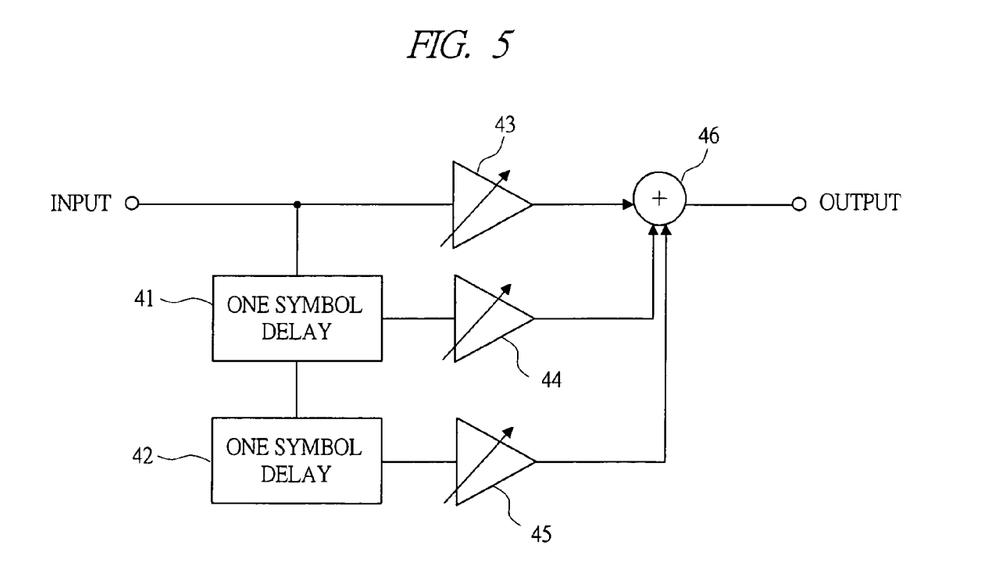
FIG. 5 is a block diagram showing a configuration example of a pre-emphasis circuit according to a conventional technique studied as a premise of the present invention.

As conventional techniques of this type, for example, the data driver circuit of the transmission side as schematically shown in FIG. 5 is used in Japanese Patent Application Publication No. 2007-515130 (Patent Document 1). The driver circuit of FIG. 5 is configured with: delay circuits 41 and 42 for one data symbol time (allowable longest time for transmitting one bit data, or inverse number of data rate); output buffers 43, 44, and 45 each having a driving force adjustment function; and a waveform adder 46. An example in which a pre-emphasis is achieved by dividing the transmission data signal into three paths and adding waveforms obtained by adjusting the driving forces for three data symbols is shown here. In this driver circuit, the transmission data signal is directly inputted to the output buffer 43, and transmission data signals delayed by one symbol time and by two symbol times are inputted to the output buffers 44 and 45, respectively. In the waveform adder 46, output signals of the output buffers 43, 44, and 45 are added, and the added signal is outputted to the transmission line. Control amount of the pre-emphasis can be adjusted by changing the number of data symbols for the waveform addition and the driving forces of the output buffers 43, 44, and 45. As described above, ISI of a symbol point can be reduced by adding the waveform in units of the symbol time.

Also, for example, Japanese Patent Application Laid-Open Publication No. 2007-129619 (Patent Document 2) discloses an equalizer circuit which includes a first amplifier circuit, a second amplifier circuit, a filter circuit, a reverse-phase adder circuit and the like and is used in a receiver. An input signal is amplified by the first amplifier circuit and amplified also by the second amplifier circuit via the filter circuit, and the reverse-phase adder circuit subtracts an output of the second amplifier circuit from an output of the first amplifier circuit to output the subtracted result. The filter circuit includes at least an integration circuit and is configured with a low pass filter and a band pass filter. Accordingly, a signal in which a high-band component of the input signal is more emphasized is obtained from the reverse-phase adder circuit.

SUMMARY OF THE INVENTION

For example, as described with reference to FIG. 5, in the driver circuit on the transmission side of the data transmission system, the pre-emphasis in units of the symbol time is achieved by adding waveforms each delayed in units of the symbol time. However, when a data transmission speed is further increased, the signal of a high frequency component is attenuated, and further, a one symbol time which is allowable for signal transition is decreased as shown in the loss characteristics of FIG. 4. Therefore, a time required for the transition of the output signal of the driver circuit when the transmission data signal is transited becomes several times as long as the one symbol time, so that the data transmission becomes difficult at an accelerated pace. In a transmission system with a higher speed than a certain transmission speed, regardless of the loss of the transmission line any more, the transmission signal is largely attenuated only by the transmission loss caused by load capacitances due to the output impedance of the output buffer, the pad and others, and therefore, the data transmission becomes almost impossible.

For performing the transmission using a conventional pre-emphasis technique in such a high-speed data transmission system having the large transmission loss, an increase of the number of waveforms to be added is required. However, this leads to increases in cost such as a circuit scale and the number of design steps and increase in power consumption. Also, since its attenuation amount is too large, it is difficult to complete the waveform transition of the output signal of the driver circuit within the one symbol time in the conventional pre-emphasis in units of the symbol time even if the number of waveforms to be added is increased.

The present invention is made for solving such a problem, and one of its objects is to provide a pre-emphasis circuit capable of improving a communication quality of a data transmission at low cost. The above and other objects and novel characteristics of the present invention will be apparent from the description of the present specification and the accompanying drawings.

Outlines of typical ones of the inventions disclosed in the present application will be briefly described as follows.

That is, a pre-emphasis circuit according to a typical embodiment of the present invention is configured with: a transition detection circuit for detecting a transition of a transmission data signal; and a driver circuit for emphasizing the transition of the transmission data signal by using a detection signal of the transition detection circuit so as to offset a loss of a transmission line and then outputting the resultant signal to the outside. Also, a pre-emphasis circuit according to another typical embodiment of the present invention is configured with: a transition detection circuit for detecting a transition of a pair of transmission data signals to be differential signals and outputting a detection signal of each signal pair; and a driver circuit for emphasizing the transition of each of the pair of transmission data signals by using each of detection signals of the transition detection circuit so as to offset a loss of a transmission line and then outputting the resultant signal to the outside. Further, the transition detection circuit has a configuration capable of compensating an offset voltage between differential signals and the like by making difference in a magnitude of the detection signals outputted for each signal pair.

The effect obtained by typical aspects of the present invention disclosed in the present application is briefly described as follows. That is, improvement of a communication quality of a data transmission can be achieved at low cost.

DESCRIPTIONS OF THE PREFERRED EMBODIMENTS

Hereinafter, embodiments of the present invention will be described in detail with reference to the accompanying drawings. Components having the same function are denoted by the same reference symbols throughout the drawings for describing the embodiment, and the repetitive description thereof will be omitted. In addition, in the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

First, regarding a pre-emphasis circuit according to a main embodiment of the present invention, a configuration thereof will be briefly described below.

A pre-emphasis circuit according to the present embodiment is configured with: a driver circuit for performing a pre-emphasis to an inputted transmission data signal and then outputting an output data signal which is a result of the pre-emphasis; and a transition detection circuit for detecting a transition of the transmission data signal. Also, the driver circuit performs an operation of emphasizing the transition of the transmission data signal by using a detection signal from the transition detection circuit when the pre-emphasis is performed, and outputs the output data signal which is a result of the transition emphasis. Accordingly, the pre-emphasis for compensating the attenuation of high-frequency band due to the transmission line can be achieved with a simple circuit configuration (that is, at low cost), and the communication quality of data transmission can be improved.

Here, more specifically, the driver circuit is configured with, for example, a current switch circuit and a current adder circuit. The current switch circuit includes: a transistor for carrying a driving current in accordance with a voltage value of the transmission data signal; and a load unit electrically connected to the transistor and converting the driving current flowing in the transistor into a voltage. On the other hand, the current adder circuit includes a transistor electrically connected to the load unit, carrying a driving current in accordance with a voltage value of the detection signal from the transition detection circuit, and adding (subtracting) the driving current to (from) a driving current flowing in the load unit.

Also, the transition detection circuit has a configuration in which a detection pulse signal is outputted upon reception of the transition of the transmission data signal and either or both a voltage amplitude and a pulse width (pulse output time) of the detection pulse signal can be controlled by external setting. Accordingly, the pre-emphasis can be flexibly achieved in accordance with the characteristics of various transmission lines.

More specifically, the transition detection circuit is configured with, for example, a so-called differentiation circuit including: a capacitor to one end of which the transmission data signal is inputted and the other end of which is connected to a transistor of the current adder circuit; and a resistor inserted between the other end of the capacitor and a power supply of the transition detection circuit. Also, such a configuration is provided that either or both a value of the resistor and a value of the capacitor can be controlled by external setting. Note that the resistor can be also achieved by, for example, a single or a plurality of transistors. Further, it is preferable that a power supply of the driver circuit and a power supply of the transition detection circuit have different voltage values from each other, whereby an effect of the pre-emphasis can be enhanced.

Furthermore, the pre-emphasis circuit according to the present embodiment has, in addition to the configuration as described above, a differential circuit configuration in which a transmission data signal and an inverse transmission data signal are inputted, the pre-emphasis is performed to the signals, and an output data signal and an inverse output data signal which are results of the pre-emphasis are outputted. In this case, the above-described current switch circuit includes two transistors to be a differential pair and two load units electrically connected to each of the transistors, and the current adder circuit includes two transistors electrically connected to each of the two load units and being a differential pair. Also, the transition detection circuit detects a transition of the transmission data signal and outputs a first detection pulse signal having a polarity corresponding to a direction of the transition, and further detects a transition of the inverse transmission data signal and outputs a second detection pulse signal having a polarity corresponding to a direction of the transition. The differential transistor pair in the current adder circuit is operated with using the first and second detection pulse signals as the differential input to add the driving current of one load unit and subtract the driving current of the other load unit. By using the pre-emphasis circuit having the differential configuration in the above-described manner, it is possible to support a higher-speed transmission system, and further, an appropriate pre-emphasis can be achieved at low cost.

Still further, the pre-emphasis circuit with the differential circuit configuration is configured so that, regarding the first and second detection pulse signals, either or both absolute values of voltage amplitudes of the pulse signals and sizes of pulse widths (pulse output times) thereof are made different. For example, when the transition detection circuit is configured with the capacitor and the resistor as described above, this can be achieved by controlling a capacitance value or a resistance value corresponding to the first detection pulse signal and a capacitance value or a resistance value corresponding to the second detection pulse signal to be different values by external setting. Alternatively, this can be achieved by applying a configuration in which a current source can be connected between either the current adder circuit side node of the capacitor corresponding to the first detection pulse signal or the current adder circuit side node of the capacitor corresponding to the second detection pulse signal and the power supply of the transition detection circuit or a ground node. By making the difference between the first and second detection pulse signals in this manner, it is possible to compensate a differential signal characteristic of the transmission line, an offset voltage of the amplifier circuit, and the like.

Next, more specific configurations of the pre-emphasis circuit including these configurations will be described in detail in the following embodiments.

First Embodiment

Figure 1:
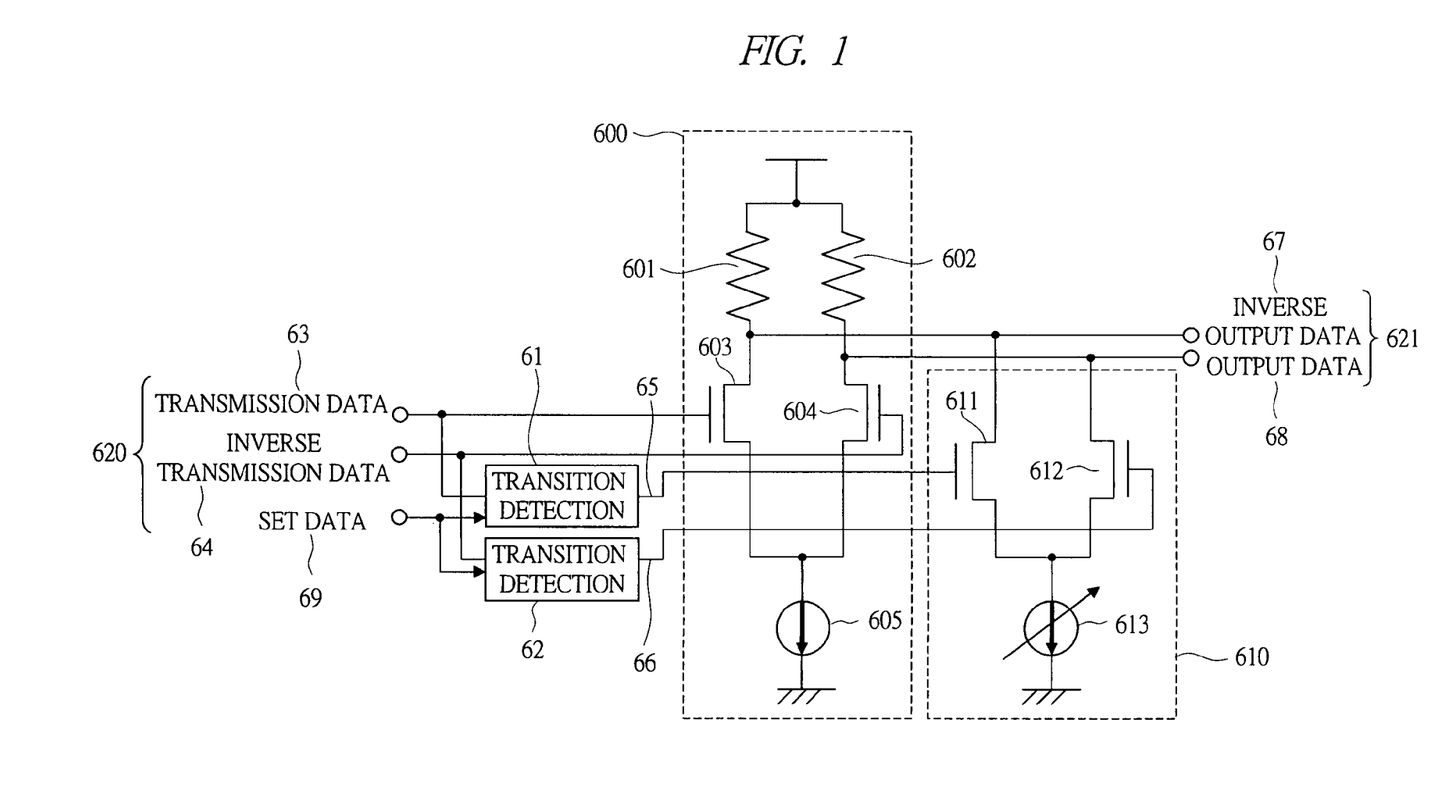
FIG. 1 is a circuit diagram showing a configuration example of a pre-emphasis circuit according to a first embodiment of the present invention.

FIG. 1 is a circuit diagram showing a configuration example of a pre-emphasis circuit according to a first embodiment of the present invention. The pre-emphasis circuit according to the present embodiment is included in the transmitter 11 in the data transmission system of FIG. 2 described above. The pre-emphasis circuit (transmitter or transmission-side driver circuit) of FIG. 1 is configured with transition detection circuits 61 and 62, a current switch circuit 600, and a current adder circuit 610. Although a differential circuit is described as an example in the present embodiment, a single-ended circuit may be used. Both circuits of the current switch circuit 600 and the current adder circuit 610 make up an output buffer for outputting a differential data input signal to the transmission line.

The current switch circuit 600 is configured with load resistors 601 and 602, NMOS transistors 603 and 604, and a current source 605. Also, the current adder circuit 610 is configured with NMOS transistors 611 and 612 and a variable current source 613. One of the NMOS transistors 603 and 604 in the current switch circuit 600 is turned on and the other is turned off by a logical value of a differential data input signal 620 including a transmission data signal 63 and an inverse transmission data signal 64, so that a differential data output signal 621 including an output data signal 68 and an inverse output data signal 67 is determined. The current adder circuit 610 is provided for controlling the driving force of the output buffer, and it is connected to the differential data output signal 621 of the current switch circuit 600 to add a current for driving the differential data output signal 621.

The transmission data signal 63 and the inverse transmission data signal 64 are connected to gate terminals of the NMOS transistors 603 and 604 of the current switch circuit 600, respectively. Also, the transmission data signal 63 and the inverse transmission data signal 64 are connected also to the transition detection circuits 61 and 62, respectively, and outputs of the transition detection circuits 61 and 62 are connected to gate terminals of the NMOS transistors 611 and 612 of the current adder circuit 610, respectively. The transition detection circuit 61 is a circuit for detecting a data transition of the transmission data signal 63, and the transition detection circuit 62 is a circuit for detecting a data transition of the inverse transmission data signal 64. The transition detection circuits 61 and 62 have the same circuit configuration, and they can set the operation characteristics based on a common set data signal 69 though its details are described later.

Figure 7:
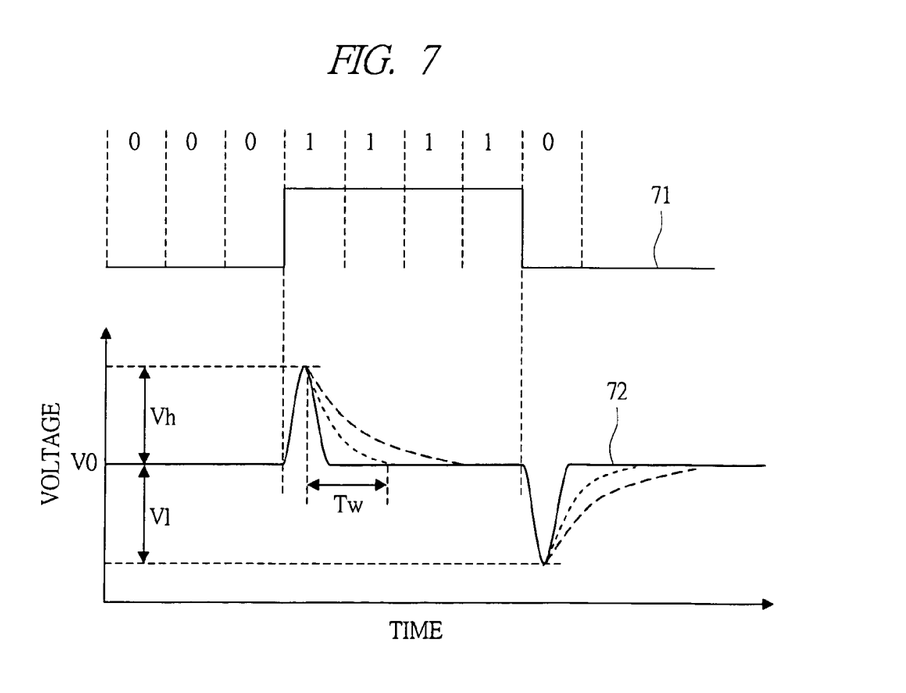
FIG. 7 is a waveform diagram showing an operation example of a transition detection circuit of FIG. 1.

FIG. 7 shows one example of operation waveforms of the transition detection circuits 61 and 62. A waveform 71 of FIG. 7 indicates the transmission data signal 63 which is an input of the transition detection circuit 61. Also, a waveform 72 indicates a waveform of a node 65 in FIG. 1 which is an output of the transition detection circuit 61. In FIG. 7, the case where a digital signal "00011110" is inputted as the transmission data signal 63 is shown as an example. The transition detection circuit 61 is a circuit for detecting a transition of the transmission data signal 63 from 0 to 1 or from 1 to 0, and outputting a pulse signal at that time.

The transition detection circuit 61 outputs a fixed voltage V0 when the transmission data signal 63 is not transited (when 0 or 1 of the transmission data signal is continued). When the transmission data signal 63 is transited from 0 to 1, a pulse signal to be a largest voltage V0+Vh is outputted. Contrarily, when the transmission data signal 63 is transited from 1 to 0, a pulse signal to be a smallest voltage V0−Vl is outputted. Vh and Vl can be controlled based on a set data signal 69 as described later. After the output (node 65) of the transition detection circuit 61 is transited from the voltage V0 to the voltage V0+Vh or the voltage V0−Vl in the transition of the transmission data signal, it gradually converges on the original voltage V0. A time Tw for converging on the original voltage V0 shown in FIG. 7 can be also controlled based on the set data signal 69 as described later. Note that the transition detection circuit 62 performs the same operation as the transition detection circuit 61 for the inverse transmission data signal 64.

Figure 8:
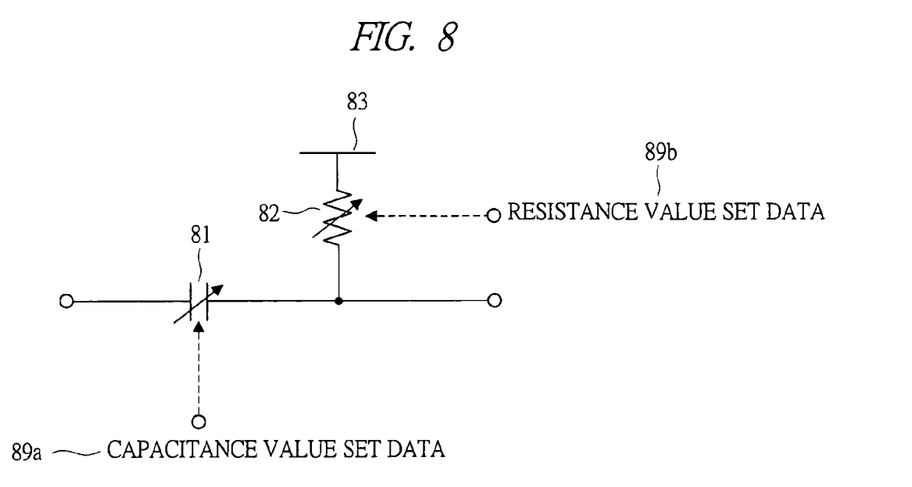
FIG. 8 is a circuit diagram showing a detailed configuration example of the transition detection circuit of FIG. 1.

FIG. 8 is one of configuration examples of the transition detection circuits 61 and 62. Each of the transition detection circuits 61 and 62 is configured with a capacitor 81 whose capacitance value is variable or fixed and a resistor 82 whose resistance value is variable or fixed. The capacitor 81 is inserted between the input and the output in each of the transition detection circuits 61 and 62, and the resistor 82 is inserted between the output and a power supply 83. The voltage V0 of the waveform 72 of FIG. 7 is equal to a voltage of the power supply 83. Since the input signal is connected to the output via the capacitor 81, a signal which is varied in the same voltage direction as that of the input signal is outputted only when the input signal is varied. Compared to this, when the input signal is fixed, the voltage V0 is outputted.

As shown in FIG. 7, voltages outputted from the transition detection circuits 61 and 62 are the voltage V0+Vh when the input signal is transited from 0 to 1 and the voltage V0−Vl when the input signal is transited from 1 to 0. When the output signal is varied from V0, charging and discharging of charges are performed between the power supply 83 and the capacitor 81 via the resistor 82, so that the output voltage gradually comes close to the voltage V0. By varying either or both the capacitance value of the capacitor 81 and the resistance value of the resistor 82 by a capacitance value set data signal 89*a* and/or a resistance value set data signal 89*b* corresponding to the above-described set data signal 69, it is possible to control the voltage V0+Vh and the voltage V0−Vl of the waveform 72 of FIG. 7 and the time Tw for returning from a top of the pulse signal to the fixed voltage V0.

Figure 9:
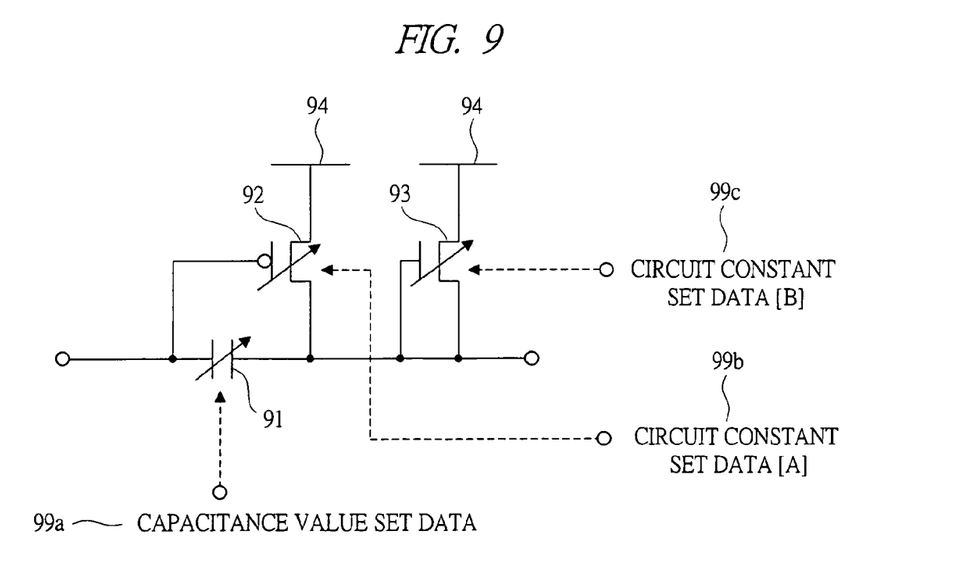
FIG. 9 is a circuit diagram showing another detailed configuration example of the transition detection circuit of FIG. 1.

FIG. 9 shows another configuration example of the transition detection circuits 61 and 62, in which a transistor is used instead of the resistor 82 of FIG. 8. Each of the transition detection circuits 61 and 62 is configured with a capacitor 91 whose capacitance value is variable or fixed and a PMOS transistor 92 and an NMOS transistor 93 whose sizes are variable or fixed. The capacitor 91 is inserted between the input and the output of each of the transition detection circuits 61 and 62. A source/drain of each of the PMOS transistor 92 and the NMOS transistor 93 is inserted between the output and a power supply 94. A gate of the PMOS transistor 92 is connected to the input and a gate of the NMOS transistor 93 is connected to the output. The voltage V0 of the waveform 72 of FIG. 7 is equal to a voltage of the power supply 94. Since a behavior in the transition of the input signal is almost the same as the case of FIG. 8, descriptions thereof are briefly made below.

In the configuration example of FIG. 9, the charging and discharging of charges of the capacitor 91 when the output signal is varied from V0 are performed by the PMOS transistor 92 and the NMOS transistor 93. A capacitance value of the capacitor 91 can be set by a capacitance value set data signal 99*a* corresponding to the set data signal 69. In the PMOS transistor 92 and the NMOS transistor 93, for example, gate widths and the like can be set in accordance with a circuit constant set data signal [A] 99*b* and a circuit constant set data signal [B] 99*c* corresponding to the set data signal 69, respectively, and accordingly, a resistance value between the source and drain can be variably set. The PMOS transistor 92 is operated mainly when the input is transited from 1 to 0, and the NMOS transistor 93 is operated mainly when the input is transited from 0 to 1. Note that a power supply voltage of each of the transition detection circuits 61 and 62 may be the same voltage as or different voltage from a power supply voltage of the current switch circuit 600. When the power supply voltage of each of the transition detection circuits 61 and 62 is the voltage different from the power supply voltage of the current switch circuit 600, effects of the pre-emphasis can be more enhanced.

A simple operation content of the transmitter according to the present embodiment will be described below. As described above, the transmission data signal 63 and the inverse transmission data signal 64 are digital signals, and the transition detection signals (nodes 65 and 66) of these signals are analog signals. As the transition detection signals (65 and 66), the voltage V0 is outputted in the non-transition of the transmission data signal 63 and the inverse transmission data signal 64, and a pulse signal with a certain shape is outputted in the transition. One of the NMOS transistors 603 and 604 in the current switch circuit 600 is turned on by the transmission data signal 63 or the inverse transmission data signal 64, and the other is turned off. A drain terminal (that is, an output data signal 67 or 68 of the current switch circuit 600) of the turned-off NMOS transistor 603 or 604 outputs the power supply voltage of the current switch circuit 600 as a high level, and a drain terminal of the other turned-on transistor outputs one voltage as a low level. At this time, the low level voltage which the current switch circuit 600 outputs is expressed by "[power supply voltage of the current switch circuit 600]−[resistance value of load resistor 601 or 602]×[current value of the current source 605]".

When an operation is described with using the case where the transmission data signal 63 and the inverse transmission data signal 64 are transited from 0 to 1 and from 1 to 0, respectively as an example, the NMOS transistor 603 is turned on from the off state, and the NMOS transistor 604 is turned off from the on state. Therefore, the current switch circuit 600 tries to output the low level to the inverse output data signal 67 and the high level to the output data signal 68 with a certain transition time.

When the transmission data signal 63 and the inverse transmission data signal 64 are transited, the current adder circuit 610 adds a current used for the transition of the output data signals (67 and 68) by the current switch circuit 600 to assume a role of shortening the transition time of the output data signals (67 and 68). The voltage V0 is inputted to the gates of the NMOS transistors 611 and 612 by the transition detection circuits 61 and 62 in the non-transition of the transmission data signals (63 and 64), and the pulse signal is inputted thereto in the transition. Since both of the NMOS transistors 611 and 612 are turned on in the non-transition of the transmission data signals, currents provided by adding the current of the current adder circuit 610 to the current of the current switch circuit 600 flow in the load resistors 601 and 602.

Therefore, voltage values of the output data signals (67 and 68) are reduced compared with the voltage outputted from the current switch circuit 600 by a voltage expressed by "[current flowing in NMOS transistors 611 and 612]×[resistance values of load resistors 601 and 602]".

In the transition of the transmission data signals (63 and 64), the pulse signal is generated by the transition detection circuits 61 and 62, and voltage values of the output data signals (67 and 68) are as follows. A voltage of the output data signal (67 or 68) to be connected to the NMOS transistor (611 or 612) to which a voltage higher than the voltage V0 is inputted is strongly reduced. That is, the output is made to transit to a low level in a short time. This is because the currents flowing in the load resistors are increased in the transition of the transmission data signals compared with those in the non-transition. On the other hand, a voltage of the other output data signal to be connected to the other NMOS transistor to which a voltage lower than the voltage V0 is inputted is strongly raised. That is, the output is made to transit to a high level in a short time. This is because the currents flowing in the load resistors are decreased compared with those in the non-transition.

When the input of the transmission data signal described above is shown as an example, the NMOS transistor 611 is turned on more strongly than that in the non-transition, so that the inverse output data signal 67 which tries to output the low level by the current switch circuit 600 is more strongly reduced. On the other hand, the NMOS transistor 612 is turned on or off more weakly than that in the non-transition, so that the output data signal 68 which tries to output the high level by the current switch circuit 600 is more strongly raised. By this means, the transition times of the output data signals (67 and 68) of the output buffer can be shortened in the transition of the transmission data signals (63 and 64), so that signals in which the signal transition is emphasized can be transmitted.

Also, as described above, a height direction of the pulse signal and a time direction thereof can be controlled by controlling values of elements configuring the transition detection circuits 61 and 62. By controlling the height direction of the pulse signal, the current value added or subtracted in the transition can be controlled. In other words, the signal transition time and the output voltage value of the output data signals (67 and 68) can be controlled. Further, by controlling the time direction of the pulse signal, a period in which the current addition or subtraction is continued can be controlled, so that an optimum pre-emphasis can be performed for the deterioration of the communication quality due to the ISI different depending on transmission lines.

Figure 6:
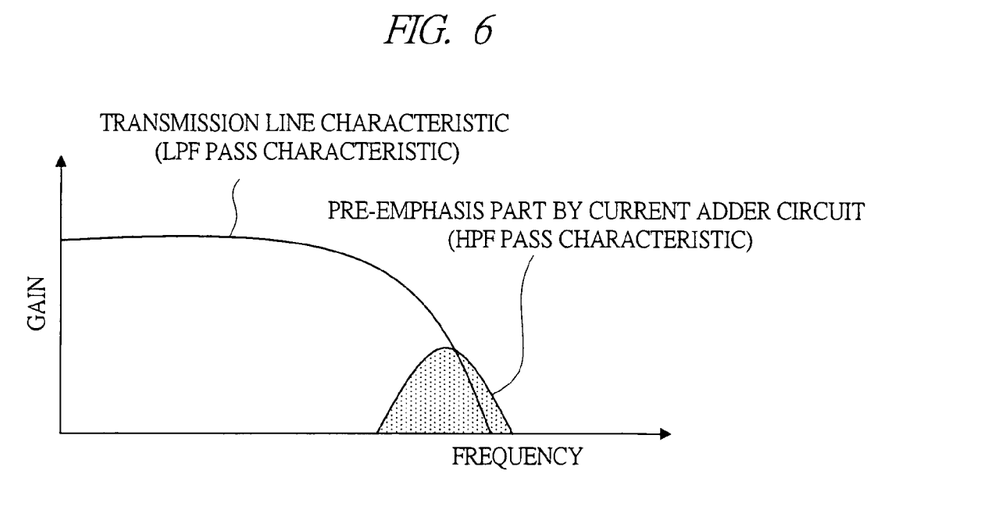
FIG. 6 is an explanatory diagram showing an operation concept of the pre-emphasis circuit of FIG. 1.

FIG. 6 is an explanatory diagram showing an operation concept of the pre-emphasis circuit of FIG. 1. As shown in FIG. 6, the transmission line has a low pass filter (LPF) characteristic, which significantly causes a gain reduction in a high frequency band. As a result, a waveform distortion is caused at a reception end of the transmission line, and the higher the transmitted data speed becomes, the more difficult the high-quality data transmission becomes. When the current adder circuit 610 is driven via the transition detection circuits 61 and 62 of FIG. 1, the gain is previously added by a high pass filter (HPF) characteristic of the transition detection circuits 61 and 62 in the transition of the transmission data signal (that is, the high frequency band of the transmission data signal) to the transmission line, and therefore, the gain reduction in the high frequency band due to the transmission line can be compensated. Consequently, the quality of the data transmission can be improved, and increase in the data transmission speed can be achieved.

As described above, by transmitting the signal in which the signal transition of the transmission data signal is emphasized, the pre-emphasis in the transmitter can be performed. Also, by varying the voltage direction and the time direction of the pulse signal outputted from each of the transition detection circuits 61 and 62, it is possible to control the effects of the pre-emphasis and apply the optimum pre-emphasis in accordance with the characteristics of the transmission lines.

Second Embodiment

Figure 10:
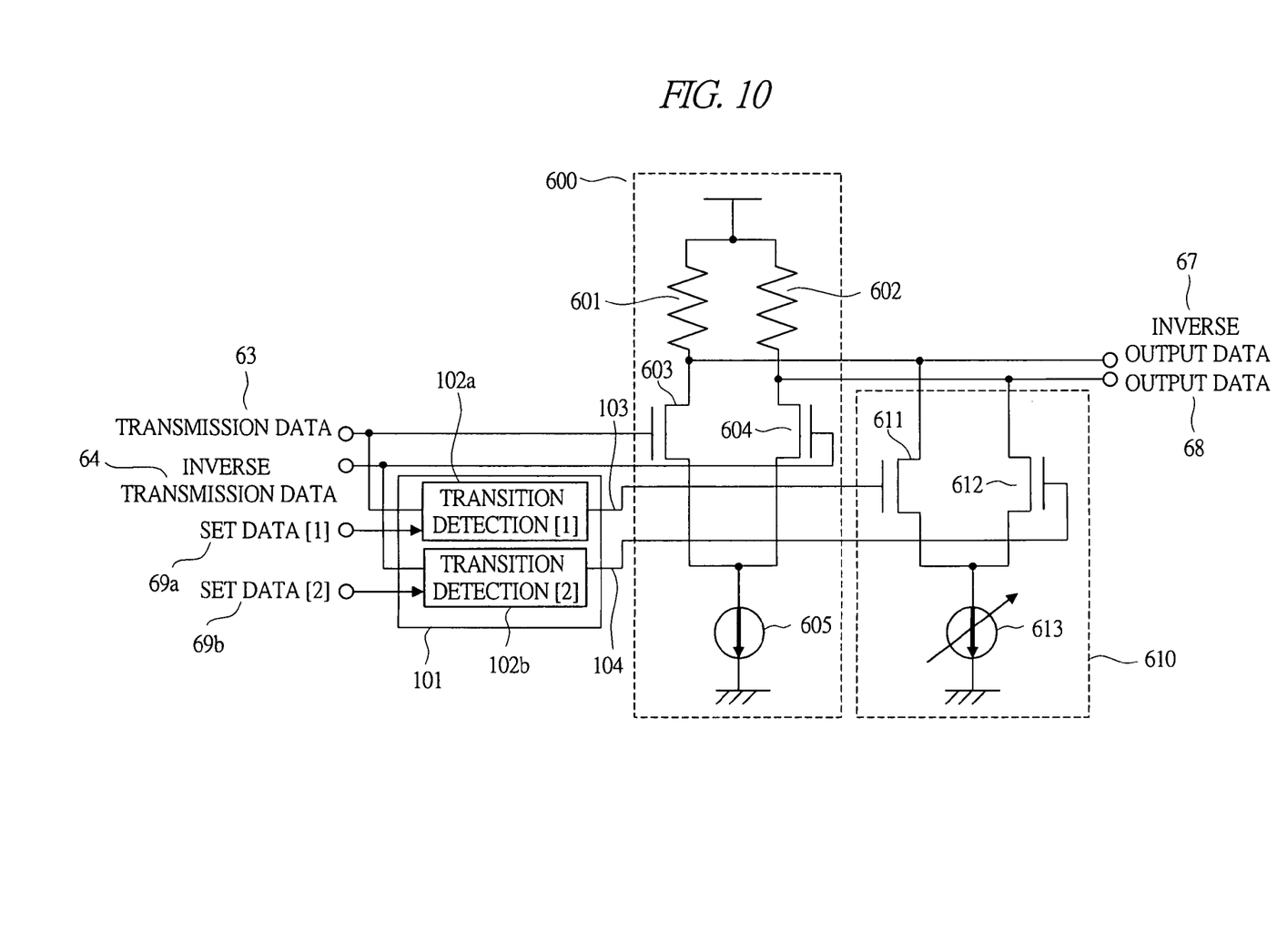
FIG. 10 is a circuit diagram showing a configuration example of a pre-emphasis circuit according to a second embodiment of the present invention.

FIG. 10 is a circuit diagram showing a configuration example of a pre-emphasis circuit according to a second embodiment of the present invention. The pre-emphasis circuit shown in FIG. 10 relates to the pre-emphasis circuit on the transmission side in the data transmission system shown in FIG. 2. Since outlines of the data transmission system shown in FIG. 2 are already described, descriptions thereof are omitted. Also, in FIG. 10, the same numbers are added to the same components as those of FIG. 1 described in the first embodiment, and descriptions thereof are omitted.

The pre-emphasis circuit- (transmitter or transmission-side driver circuit) shown in FIG. 10 is configured with a transition detection unit 101, a current switch circuit 600, and a current adder circuit 610, and the transition detection unit 101 is configured so as to include a transition detection circuit [1] 102*a* and a transition detection circuit [2] 102*b*. Although a differential circuit is described as an example in the present embodiment, a single-ended circuit may be used. Since configurations of the current switch circuit 600 and the current adder circuit 610 are the same as those of the first embodiment, descriptions thereof are omitted.

A transmission data signal 63 and an inverse transmission data signal 64 which is an inverse signal of the transmission data signal 63 are inputted to the pre-emphasis circuit as a differential signal. The transmission data signal 63 and the inverse transmission data signal 64 are digital signals. The transmission data signal 63 and the inverse transmission data signal 64 are connected to gate terminals of NMOS transistors 603 and 604 in the current switch circuit 600, respectively. Also, the transmission data signal 63 and the inverse transmission data signal 64 are also connected to the transition detection circuit [1] 102*a* and the transition detection circuit [2] 102*b*, respectively, and nodes 103 and 104 to be the outputs thereof are connected to gate terminals of NMOS transistors 611 and 612 in the current adder circuit 610, respectively.

The transition detection circuit [1] 102*a* and the transition detection circuit [2] 102*b* are circuits for detecting the data transitions of the transmission data signal 63 and the inverse transmission data signal 64, respectively. In the transition detection circuit [1] 102*a* and the transition detection circuit [2] 102*b*, characteristics can be set by a set data signal [1] 69*a* and a set data signal [2] 69*b*, respectively. The second embodiment is mainly characterized in that, unlike the case of the first embodiment, the transition detection circuit [1] 102*a* and the transition detection circuit [2] 102*b* have respectively different configurations, or setting values of the set data signal [1] 69*a* and the set data signal [2] 69*b* are different from each other though the transition detection circuit [1] 102*a* and the transition detection circuit [2] 102*b* have the same configurations.

Figure 11:
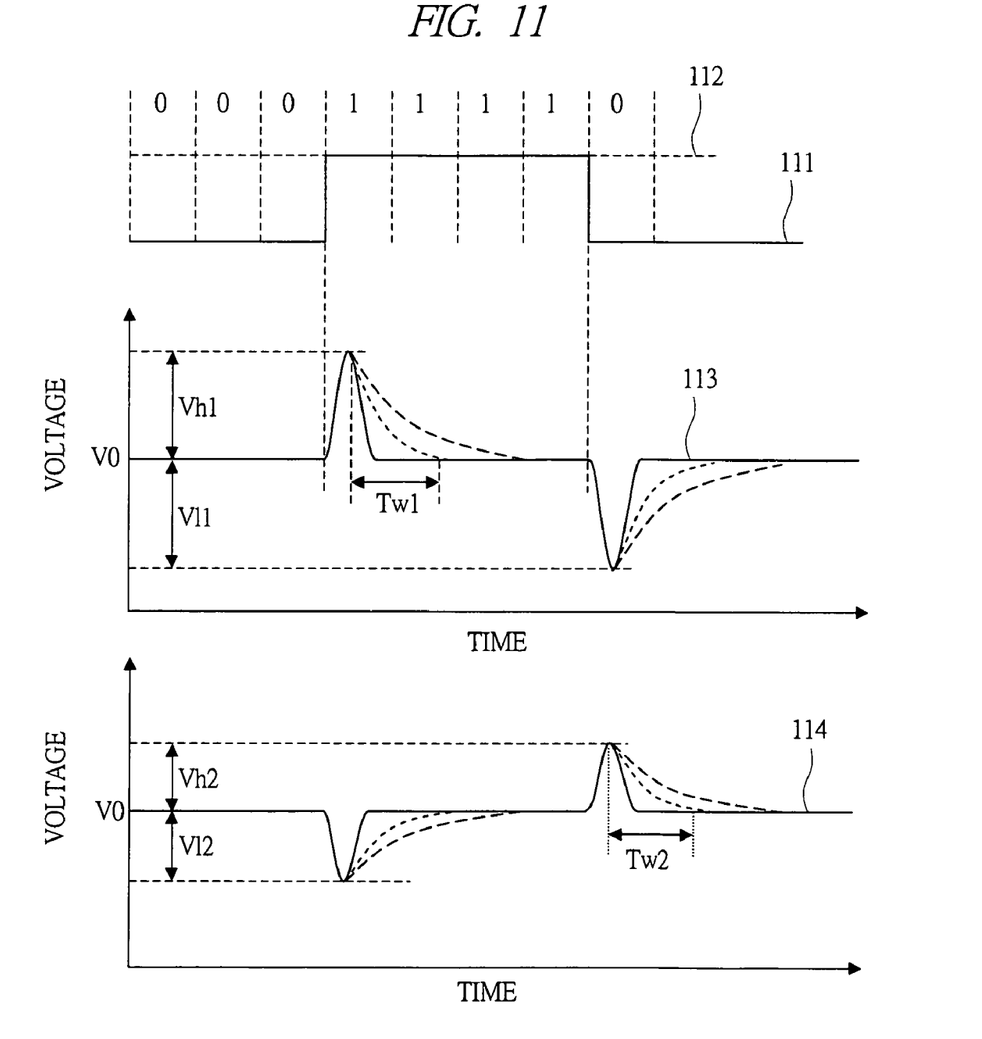
FIG. 11 is a waveform diagram showing an operation example of a transition detection unit of FIG. 10.

FIG. 11 shows one example of operation waveforms of the transition detection circuit [1] 102*a* and the transition detection circuit [2] 102*b*. Waveforms 111 and 112 of FIG. 11 indicate the transmission data signal 63 and the inverse transmission data signal 64 which are inputs of the transition detection circuits [1] 102a and [2] 102b, respectively. Also, a waveform 113 indicates a waveform of the node 103 shown in FIG. 10 which is an output of the transition detection circuit [1] 102a. Similarly, a waveform 114 indicates a waveform of the node 104 shown in FIG. 10 which is an output of the transition detection circuit [2] 102b. In FIG. 11, the case where a digital signal "00011110" is inputted as the transmission data signal 63 is shown as an example. The transition detection circuits [1] 102a and [2] 102b are circuits for detecting the transitions of the transmission data signal 63 and the inverse transmission data signal 64 from 0 to 1 or from 1 to 0, and outputting the pulse signals at that time.

A different point between the output of the transition detection circuit [1] 102a and the output of the transition detection circuit [2] 102b is that shapes of the pulse signals which are detection results of the transmission data signals (63 and 64) are different in either the voltage direction or the time direction or in both of them. By previously making the difference in the shapes of the pulse signals to be outputted in this manner, it is possible to correct an offset voltage of a circuit due to a manufacture variation of transistors and characteristic errors of the differential pair signal in the transmission line.

The transition detection circuits [1] 102a and [2] 102b output a fixed voltage V0 when the transmission data signals (63 and 64) are not transited (when 0 or 1 of the transmission data signals is continued). When the transmission data signals (63 and 64) are transited from 0 to 1, the transition detection circuit [1] 102a outputs a pulse signal to be a largest voltage V0+Vh1, and the transition detection circuit [2] 102b outputs a pulse signal to be V0+Vh2. Contrarily, when the transmission data signals (63 and 64) are transited from 1 to 0, the transition detection circuits [1] 102a and [2] 102b output pulse signals to be the smallest voltages V0−Vl1 and V0−Vl2, respectively. Vh1, Vh2, Vl1 and Vl2 can be controlled by set data signals [1] 69a and [2] 69b as described later. After the output nodes 103 and 104 of the transition detection circuits [1] 102a and [2] 102b are transited from the voltage V0 to the voltages V0+Vh1 and V0+Vh2 or to the voltages V0−Vl1 and V0−Vl2 in the transition of the transmission data, they gradually converge on the original voltage V0. Times Tw1 and Tw2 required for converging on the original voltage V0 can be also controlled by the set data signals [1] 69a and [2] 69b as described later.

Figure 12:
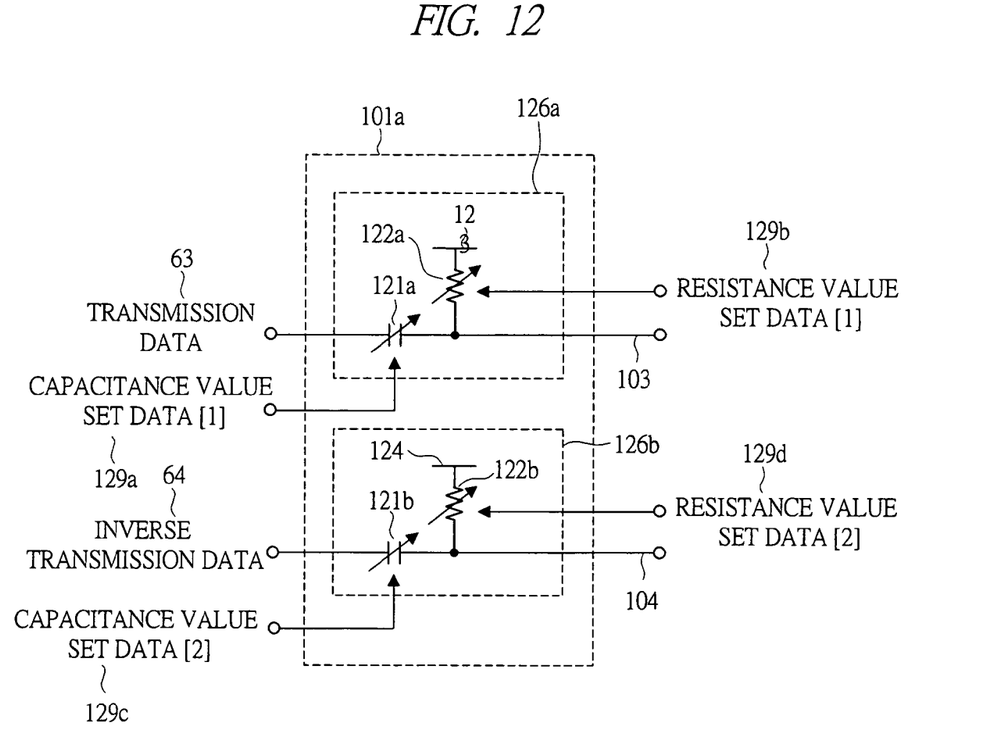
FIG. 12 is a circuit diagram showing a detailed configuration example of the transition detection unit of FIG. 10.

FIG. 12 shows another one of configuration examples of the transition detection unit 101 of FIG. 11. A transition detection unit 101a of FIG. 12 is configured with transition detection circuits 126a and 126b. The transition detection circuit 126a is configured with a capacitor 121a whose capacitance value is variable or fixed and a resistor 122a whose resistance value is variable or fixed. The transmission data signal 63 is inputted to one end of the capacitor 121a, and a gate of the NMOS transistor 611 in the current adder circuit 610 is connected to the other end (node 103). The resistor 122a is connected between the node 103 and a power supply 123. Similarly, the transition detection circuit 126b is configured with a capacitor 121b whose capacitance value is variable or fixed and a resistor 122b whose resistance value is variable or fixed. The inverse transmission data signal 64 is inputted to one end of the capacitor 121b, and a gate of the NMOS transistor 612 in the current adder circuit 610 is connected to the other end (node 104). The resistor 122b is connected between the node 104 and a power supply 124.

The capacitance value of the capacitor 121a can be set by a capacitance value set data signal [1] 129a, and the resistance value of the resistor 122a can be set by a resistance value set data signal [1] 129b. The capacitance value of the capacitor 121b can be set by a capacitance value set data signal [2] 129c, and the resistance value of the resistor 122b can be set by a resistance value set data signal [2] 129d. The capacitance value set data signal [1] 129a and the resistance value set data signal [1] 129b correspond to the set data signal [1] 69a of FIG. 10, and the capacitance value set data signal [2] 129c and the resistance value set data signal [2] 129d correspond to the set data signal [2] 69b of FIG. 10.

Here, in order to make the difference between the pulse signals outputted from the transition detection circuits 126a and 126b, respectively, the capacitance value set data signal [1] 129a and the capacitance value set data signal [2] 129c are set to have different values, the resistance value set data signal [1] 129b and the resistance value set data signal [2] 129d are set to have different values, or both of the capacitance value set data signals and the resistance value set data signals are set to have different values. The voltages V0 of waveforms 113 and 114 of FIG. 11 are equal to voltages of the power supplies 123 and 124. Since the transmission data signals (63 and 64) are outputted via the capacitors 121a and 121b, pulse signals which are varied in the same voltage directions as those of the transmission data signals are outputted to the nodes 103 and 104 only when the transmission data signals are varied. Meanwhile, when the transmission data signals are fixed, the voltage V0 is outputted thereto. Since operation details are the same as those of the first embodiment except for the shape difference of the pulses outputted each from the transition detection circuits 126a and 126b, descriptions thereof are omitted. By variably controlling the capacitance values of the capacitors 121a and 121b and the resistance values of the resistors 122a and 122b in this manner, it is possible to control the voltages V0+Vh1, V0+Vh2, V0−Vl1 and V0−Vl2 of the waveforms 113 and 114 of FIG. 11 and times Tw1 and Tw2 for returning from a top of the pulse signal to the fixed voltage V0.

Figure 13:
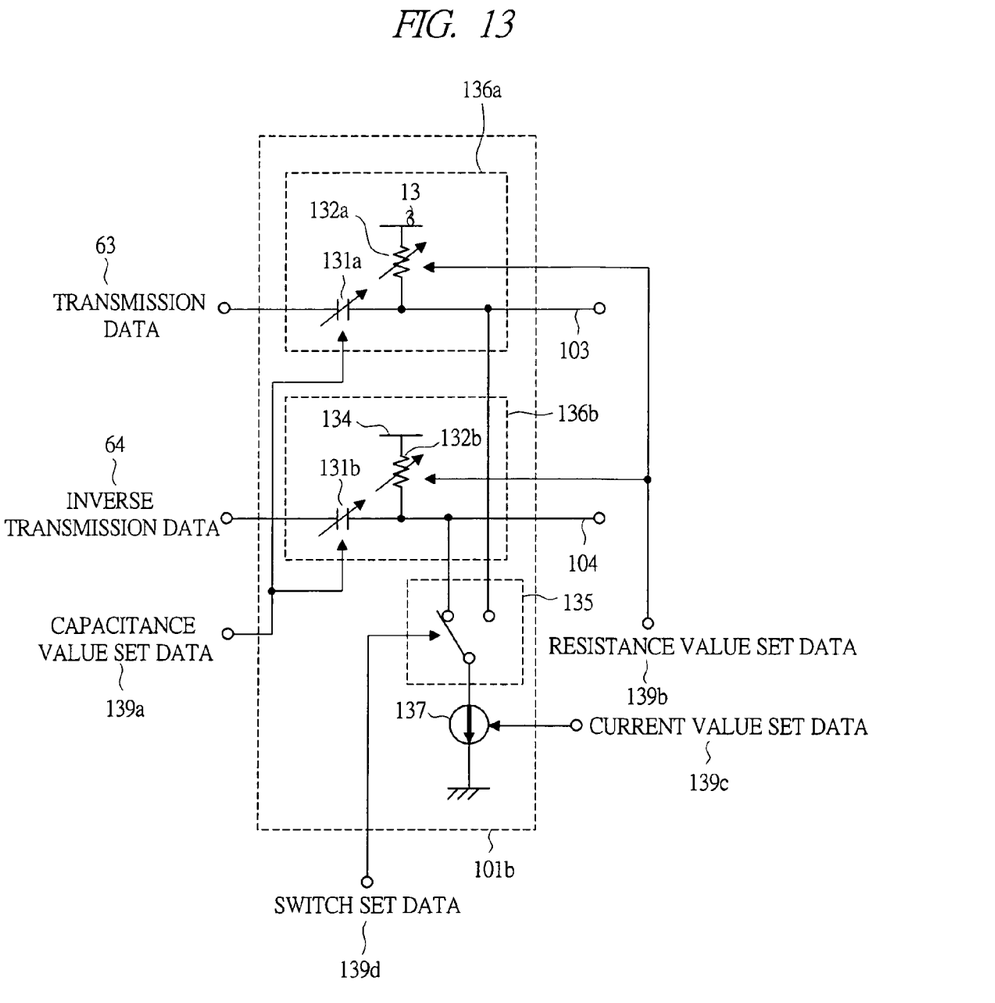
FIG. 13 is a circuit diagram showing another detailed configuration example of the transition detection unit of FIG. 10.

FIG. 13 shows another one of configuration examples of the transition detection unit 101 of FIG. 11. A transition detection unit 101b of FIG. 13 is configured with transition detection circuits 136a and 136b, a variable current source 137, and a switch circuit 135. The transition detection circuit 136a is configured with a capacitor 131a whose capacitance value is variable or fixed and a resistor 132a whose resistance value is variable or fixed. The transmission data signal 63 is inputted to one end of the capacitor 131a, and a gate of the NMOS transistor 611 in the current adder circuit 610 is connected to the other end (node 103). The resistor 132a is connected between the node 103 and a power supply 133. Similarly, the transition detection circuit 136b is configured with a capacitor 131b whose capacitance value is variable or fixed and a resistor 132b whose resistance value is variable or fixed. The inverse transmission data signal 64 is inputted to one end of the capacitor 131b, and a gate of the NMOS transistor 612 in the current adder circuit 610 is connected to the other end (node 104). The resistor 132b is connected between the node 104 and a power supply 134.

Capacitance values of the capacitors 131a and 131b can be set by a capacitance value set data signal 139a, and resistance values of the resistors 132a and 132b can be set by a resistance value set data signal 139b. Also, the switch circuit 135 connects the variable current source 137 to either the node 103 or the node 104 based on a switch set data signal 139d. A current value of the variable current source 137 can be set by a current value set data signal 139c. In this case, when considered in relation to FIG. 10, the capacitance value set data signal 139a, the resistance value set data signal 139b, the current value set data signal 139c, and the switch set data signal 139d are included in each of the set data signals [1] 69a and [2] 69b, and only the switch set data signal 139d of these is set to have different values between the set data signals [1] 69a and [2] 69b.

By connecting the variable current source 137 to either the transition detection circuit 136a or 136b with using such a configuration, it is possible to control the voltages V0+Vh1, V0+Vh2, V0−Vl1, and V0−Vl2 of the waveforms 113 and 114 of FIG. 11 and times Tw1 and Tw2 for returning from a top of the pulse signal to the fixed voltage V0, and further, it is also possible to control the voltage V0 of FIG. 11. Note that, although the examples of using the resistors 122a, 122b, 132a, and 132b are shown in FIGS. 12 and 13, it is of course possible to replace these resistors into transistors as shown in FIG. 9. Also, although the resistors 132a and 132b have the same resistance value and the capacitors 131a and 131b have the same capacitance value in FIG. 13, it is also possible to make the difference between output pulse signals of the transition detection circuits 136a and 136b by forming the configuration capable of setting these capacitance and resistance values to different values as shown in FIG. 12 and using the setting by the variable current source 137 in combination therewith.

Since the operation of the transmitter according to the second embodiment is the same as that of the first embodiment except for the shape difference between two pulse signals outputted from the transition detection unit 101, detailed descriptions thereof are omitted. Also in the transmitter of FIG. 10, similarly to the transmitter of FIG. 1, a transition time of output data signals (67 and 68) of the output buffer can be shortened in the transition of the transmission data signals (63 and 64), and a signal in which the signal transition is emphasized can be transmitted. Further, as described above, the height directions and the time directions of pulse signals of each of the differential signals can be independently controlled by controlling the value of each element configuring the transition detection unit 101. By controlling the height directions of the pulse signals, a current value added or subtracted in the transition can be controlled. In other words, signal transition times of the output data signals (67 and 68) and output voltage values thereof can be controlled. Still further, by controlling the time directions of the pulse signals, a period in which the current addition or subtraction is continued can be controlled, so that an optimum pre-emphasis can be performed for deterioration of the communication quality due to different ISI depending on transmission lines. Moreover, by independently controlling each of the differential signals by using the set data signals [1] 69a and [2] 69b, an offset voltage of a circuit and characteristics of the differential signals in the transmission line can be corrected.

Main effects according to the embodiments of the present invention described above are summarized as follows. First, by providing means of detecting the transition of the transmission data signal and outputting the signal after emphasizing the transition of the transmission data signal based on the detection result, the pre-emphasis in units of the symbol time and within the symbol time can be achieved with a simpler circuit configuration. Also, by providing means of making the difference between transition detection results of the differential transmission data signals, characteristics of the differential signals in the transmission line and an offset voltage of an amplifier circuit can be compensated.

In the foregoing, the invention made by the inventors of the present invention has been concretely described based on the embodiments. However, the present invention is not limited to the foregoing embodiments and various modifications and alterations can be made within the scope of the present invention.

The pre-emphasis circuits according to the present embodiments are particularly effective when applied to a transmitter of a high-speed serial interface which is higher than, for example, several tens of Gbps, and the application of the pre-emphasis circuits is not limited to this, but it is widely applicable to various types of data transmission systems requiring the pre-emphasis.

What is claimed is:

1. A pre-emphasis circuit provided in a transmitter of a differential data transmission system configured with the transmitter, a transmission line, and a receiver, the pre-emphasis circuit comprising:

a driver circuit for performing a pre-emphasis to a transmission data signal and an inverse transmission data signal, and outputting an output data signal and an inverse output data signal which are results of the pre-emphasis to the transmission line; and a transition detection circuit for outputting a first detection signal when a transition of the transmission data signal is detected, and outputting a second detection signal when a transition of the inverse transmission data signal is detected, wherein, when the pre-emphasis is performed, the driver circuit operates to emphasis the transitions of the transmission data signal and the inverse transmission data signal by using the first and second detection signals from the transition detection circuit, and outputs signals in which the transitions are emphasized as the output data signal and the inverse output data signal, wherein the driver circuit comprises a current switch circuit and a current adder circuit, wherein the current switch circuit comprises:

a first load unit and a second load unit;

a first transistor whose on and off states are controlled by the transmission data signal and which is electrically connected to the first load unit; and a second transistor whose on and off states are controlled by the inverse transmission data signal and which is electrically connected to the second load unit, wherein the current adder circuit comprises:

a third transistor whose on and off states are controlled by the first detection signal and which is electrically connected to the first load unit; and a fourth transistor whose on and off states are controlled by the second detection signal and which is electrically connected to the second load unit, wherein the first load unit outputs the inverse output data signal by converting a current obtained by adding currents flowing in the first transistor and the third transistor into a voltage, and the second load unit outputs the output data signal by converting a current obtained by adding currents flowing in the second transistor and the fourth transistor into a voltage, wherein each of the first detection signal and the second detection signal is a pulse signal, and wherein the transition detection circuit has a configuration in which either or both a respective voltage amplitude and a respective pulse output time of each pulse signal can variably controlled based on a predetermined set signal, wherein the transition detection circuit sets, based on the set signal, the voltage amplitude of the first detection signal and the voltage amplitude of the second detection signal to different values, the pulse output time of the first detection signal and the pulse output time of the second detection signal to different values, or the voltage amplitude and the pulse output time of the first detection signal and the voltage amplitude and the pulse output time of the second detection signal to respectively different values, and wherein the transition detection circuit comprises:

a first capacitor having a first end to which the transmission data signal is input a second end that is electrically connected to the third transistor of the current adder circuit;

a first resistor inserted between the second end of the first capacitor and a first power supply to be a fixed potential;

a second capacitor having a first end to which the inverse transmission data signal is input and a second end that is electrically connected to the fourth transistor of the current adder circuit;

a second resistor inserted between the second end of the second capacitor and a second power supply to be a fixed potential; and a variable current source connected to either the second end of the first capacitor or the second end of the second capacitor based on the set signal.

* * * * *